United States Patent [19]

Takizawa

[11] Patent Number: 5,022,286

[45] Date of Patent: Jun. 11, 1991

[54] SYSTEM FOR AND METHOD OF CONTROLLING SHIFTING IN GEAR POSITION IN AUTOMATIC TRANSMISSION

[75] Inventor: Satoshi Takizawa, Yokosuka, Japan

[73] Assignee: Nissan Motor Co., Ltd., Yokohama, Japan

[21] Appl. No.: 336,431

[22] Filed: Apr. 11, 1989

[30] Foreign Application Priority Data

Apr. 11, 1988 [JP] Japan .................................. 63-87390
Apr. 11, 1988 [JP] Japan .................................. 63-87391

[51] Int. Cl.$^5$ ............................................ B60K 41/06
[52] U.S. Cl. ................................................ 74/866
[58] Field of Search ................. 74/866, 867, 865, 877; 364/424.1

[56] References Cited

U.S. PATENT DOCUMENTS

| | | | |
|---|---|---|---|
| 4,041,809 | 8/1977 | Dick et al. | 74/866 |
| 4,253,346 | 3/1981 | Kühnle | 74/866 |
| 4,412,290 | 10/1983 | Pannier | 74/866 |
| 4,456,107 | 6/1984 | Ito et al. | 74/866 |
| 4,457,410 | 7/1984 | Suga et al. | 74/866 |
| 4,463,822 | 8/1984 | Tanigawa et al. | 74/866 |
| 4,551,802 | 11/1985 | Smyth | 74/866 |
| 4,671,139 | 6/1987 | Downs et al. | 74/866 |
| 4,680,992 | 7/1987 | Hayasaki et al. | 74/869 |
| 4,730,519 | 3/1988 | Nakamura et al. | 74/866 |
| 4,823,646 | 4/1989 | Yoshimura et al. | 74/866 |

OTHER PUBLICATIONS

Service Manual, Nissan Full-Range Electronically Controlled Automatic Transmission of RE4R01A Type, 1987 (A261C07), issued by Nissan Motor Company, Limited in Mar. 1987.

Japanese Service Manual for Automatic Transmission Types L4N71B and E4N71B, Nissan Motor Company Limited, Nov., 1982.

*Primary Examiner*—Dwight Diehl
*Attorney, Agent, or Firm*—Foley & Lardner

[57] ABSTRACT

An automatic transmission with a downshift control is disclosed. Upon deceleration, the downshift is effected to cause engine brake running with downshifted state to take place. When the driver depresses an accelertator pedal to open the engine throttle, i.e., a power demand, the engine brake running with downshifted state is to be released but with a predetermined delay time. More specifically, the engine brake running with downshifted state is released upon expiration of the predetermined delay time after the power demand has been detected. In the second embodiment, the release timing is more precisely controlled such that the delayed release becomes moot when the power demand disappears, so that the downshifted state is immediately released when the accelerator pedal is released after it has been depressed.

10 Claims, 6 Drawing Sheets

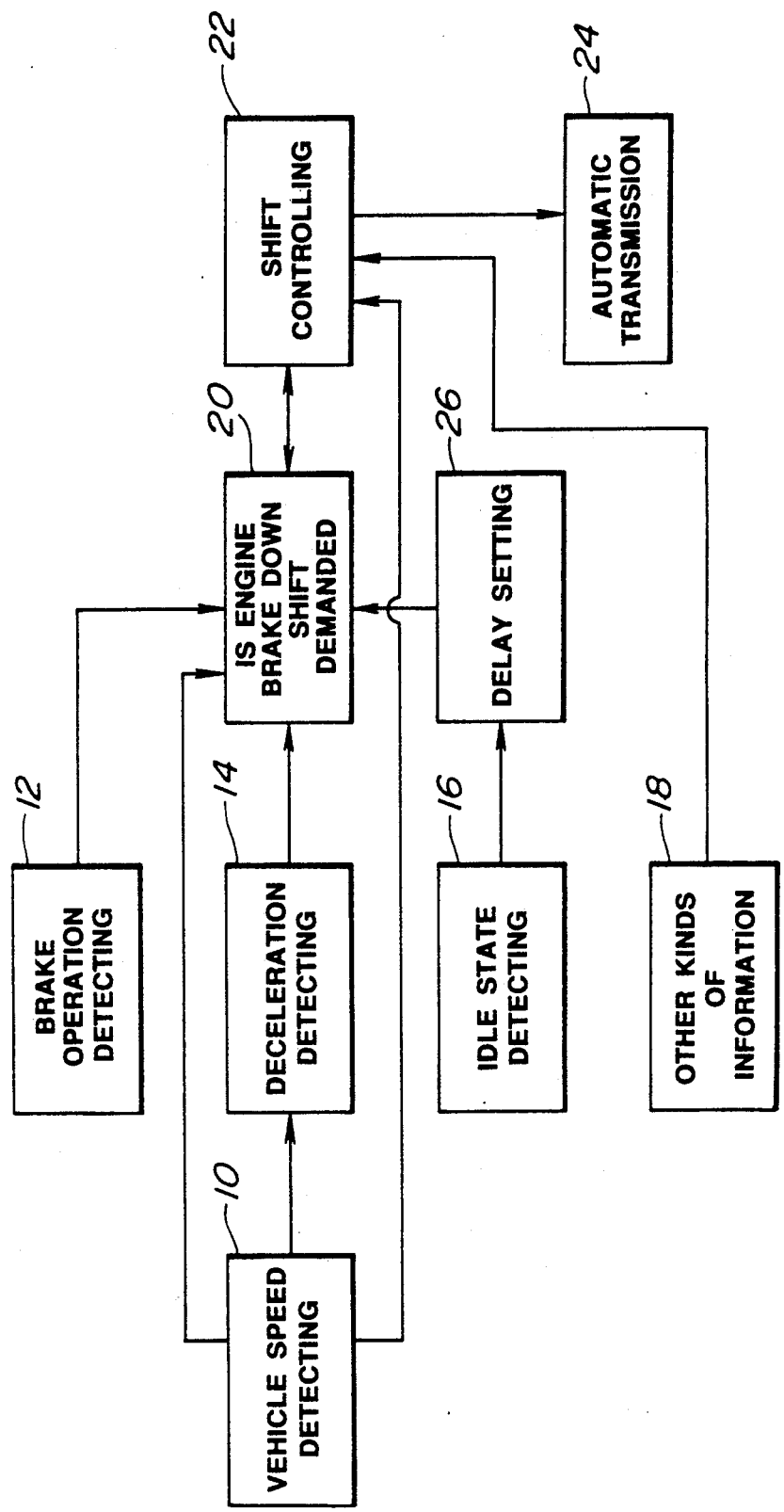

SYSTEM FOR AND METHOD OF CONTROLLING SHIFTING IN GEAR POSITION IN AUTOMATIC TRANSMISSION

BACKGROUND OF THE INVENTION

The present invention relates to a system for, and a method of, controlling shifting in gear position in an automatic transmission, and more particularly to a system for, and a method of controlling shifting in gear position in an automatic transmission when an automotive vehicle which the automatic transmission is mounted on is subject to deceleration.

An automatic transmission of the E4N71B type is known. This automatic transmission is manufactured by Nissan Motor Company Limited in Japan and described in a publication "NISSAN AUTOMATIC TRANSMISSION L4N71B TYPE, E4N71B TYPE, SERVICE MANUAL 1982 (A261C04)" issued by Nissan Motor Company Limited on November in 1982. This known transmission comprises a downshift solenoid, a shift switch, an idle switch, a vehicle speed sensor, a brake switch, and a control unit. As described on page 12 of the above-mentioned publication, the downshift solenoid is rendered ON when the shift switch indicates that the third gear position is established in D range, the vehicle speed sensor detects a vehicle speed falling in a predetermined range from 30 km/h to 50 km/h, the brake switch is rendered ON, and the idle contacts of the throttle switch are rendered ON. According to this downshift control, the downshift solenoid is rendered OFF to cause an upshift to take place in the automatic transmission when the idle switch is rendered OFF in response to the driver's depressing of an accelerator pedal. This abrupt upshift from the downshifted state induces a shock and an unplesant ride feel or sensation to the driver.

An object of the present invention, therefore, is to provide a system for, and a method of, controlling the gear position in an automatic transmission when an automotive vehicle which the automatic transmission is mounted on is subject to deceleration, which are improved such that the above-mentioned shock nor the neither unplesant ride feel encountered in the prior art are eliminated or alleviated.

SUMMARY OF THE INVENTION

According to one aspect of the present invention, there is provided a method of controlling shifting in gear position in an automatic transmission for an automotive vehicle when the vehicle is subjected to deceleration, wherein an engine brake running with downshifted state is initiated when predetermined conditions are met, the method comprising the steps of:

detecting a power demand by a driver of the automotive vehicle;

releasing the automatic transmission from said engine brake running with downshifted state upon expiration of a predetermined delay time after said power demand has been detected.

According to a further aspect of the present invention, there is provided a method of controlling shifting in gear position in an automatic transmission for an automotive vehicle when the vehicle is subjected to deceleration, wherein an engine brake running with downshifted state is initiated when predetermined conditions are met, the method comprising the steps of:

detecting a power demand by a driver of the automotive vehicle;

releasing the automatic transmission from said engine brake running with downshifted state upon expiration of a predetermined delay time after said power demand has been detected unless said power demand disappears;

releasing the automatic transmission from the engine brake running with downshifted state immediately after said power demand has disappeared.

According to another aspect of the present invention, there is provided a system for controlling shifting in gear position in an automatic transmission for an automotive vehicle when the vehicle is subjected to deceleration, wherein an engine brake running with downshifted state is initiated when predetermined conditions are met, the system comprising:

means for detecting a power demand by a driver of the automotive vehicle; and means for releasing the automatic transmission from said engine brake running with downshifted state upon expiration of a predetermined delay time after said power demand has been detected.

According to still further aspect of the invention, there is provided a system for controlling shifting in gear position in an automatic transmission for an automotive vehicle when the vehicle is subjected to deceleration, wherein an engine brake running with downshifted state is initiated when predetermined conditions are met, the system comprising:

means for detecting a power demand by a driver of the automotive vehicle; and means for releasing the automatic transmission from said engine brake running with downshifted state upon expiration of a predetermined delay time after said power demand has been detected unless said power demand disappears, said releasing means being operative to release the automatic transmission from the engine brake running with downshifted state immediately after said power demand has disappeared.

BRIEF DESCRIPTION OF THE DRAWINGS

FIG. 1 is a functional block diagram of a first embodiment according to the present invention;

DETAILED DESCRIPTION OF THE INVENTION

Figure 2A:
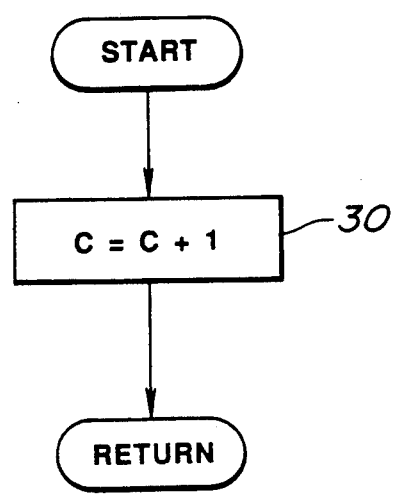
FIG. 2a is a flow chart of a program for counting a pulse generated by a vehicle speed sensor.

Before describing the embodiments according to the present invention, an automatic transmission a which the present invention is embodied or applied to is briefly described. This automatic transmission is manufactured by Nissan Motor Company Limited in Japan and described in a publication "SERVICE MANUAL, NISSAN FULL RANGE ELECTRONICALLY CONTROLLED AUTOMATIC TRANSMISSION OF RE4R01A TYPE, 1987 (A261C07)" issued by Nissan Motor Company Limited on March in 1987. This automatic transmission is disclosed in U.S. Pat. No. 4,680,992 issued to Hayasaki et al. on July 21, 1987 which is hereby incorporated by references in this application in its entirety.

FIG. 1, is a functional block diagram of a first embodiment of a system for controlling shifting in gear position in an automatic transmission. A vehicle speed detecting block 10 counts the occurrences of a pulse generated by a vehicle speed sensor for a predetermined period of time (for example, 100 ms or 354 ms) and generates the result as a vehicle speed indicative signal. The vehicle speed sensor is provided on an output shaft of an automatic transmission 24. A brake operation detecting block 12 is provided where a brake signal generated by a brake switch is detected and it is determined whether the brake is operated or not. A deceleration detecting block 14 is provided where a derivative of the vehicle speed indicative signal from the vehicle speed detecting block 10 during a predetermined period of time is calculated and the result is outputted as a deceleration indicative signal. Alternatively, the deceleration which the vehicle is subject to can be directly given by a deceleration sensor mounted to measure the longitudinal deceleration which the vehicle is subject to. An idle state detecting block 16 is provided where an output signal of an idle switch is detected and it is determined whether the engine throttle valve is at the idle speed position or not. The idle switch is arranged within the engine throttle chamber. A block 18 is provided where the other kinds of information, such as a throttle opening degree and an oil temperature of oil used in the automatic transmission, which are necessary for the shifting control are detected and generated as output signals.

There is provided a block 20 for determining whether there is any demand for engine brake downshift. Fed to this block 20 are the vehicle speed indicative signal from the block 10, the brake operation indicative signal from the block 12, the idle operation indicative signal from a block 26 accompanied by a delay, and the gear position indicative signal from a shift controlling block 22. At the block 20, it is determined whether predetermined conditions are met for effecting downshifting for an engine brake running or not. The output of the block 20 indicative of the result is fed to the shift controlling block 22.

The shift controlling block 22 controls shifting in gear position in the automatic transmission 24 in a conventional manner in the absence of the output signal from the block 20 indicative of the fact that the predetermined conditions for effecting downshifting for engine brake running are met. However, upon receipt of the output signal from the block 20 indicative of the fact that the predetermined conditions for effecting downshifting for engine brake running are met, the shift controlling block 22 commands downshifting and engaging of a clutch for effecting engine brake running, such as an overrunning clutch in the case of the automatic transmission disclosed in U.S. Pat. No. 4,680,992 issued to Hayasaki et al. on July 21, 1987 which has been hereby incorporated in its entirety by reference.

The previously mentioned block 26 for setting the delay gives the predetermined delay to the block 20 only when the output of the idle operation detecting block 16 indicates that the idle switch is rendered OFF.

Figure 2B:
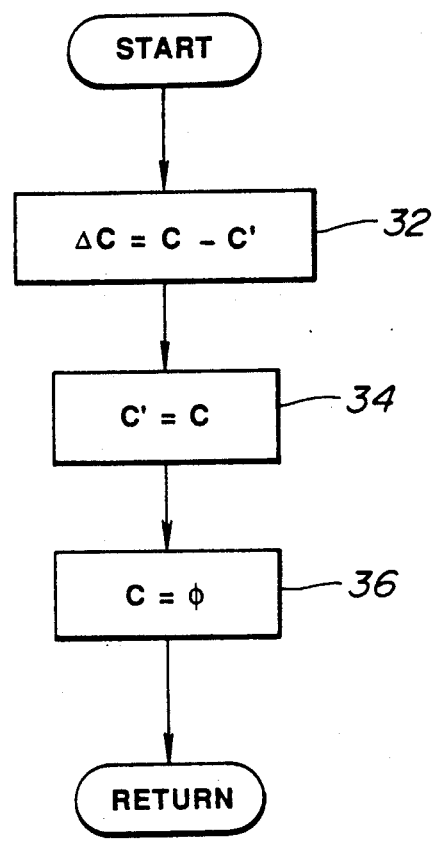
FIG. 2b is a flow chart of a program for determining a deceleration to which an automotive vehicle is subjected.

Referring to FIGS. 2a and 2b, the deceleration detecting block 14 is further described. This block has a counter C which counts occurences of pulse signals from the vehicle speed sensor. The execution of a program as shown by the flow chart in FIG. 2a is initiated by interruption occurring in synchronism with the occurrence of pulse signal from the vehicle speed sensor. At a step 30, the content of the counter C is increased by one. The execution of a program as illustrated in a flow chart in FIG. 2b is initiated upon expiration of a predetermined period of time for example 100 ms or 354 ms. At a step 32, a difference $\Delta C$ (delta C) is calculated by subtracting $C'$ from $C$, where $C$ represents the present content of the counter, while $C'$ the previous content of the counter given the predetermined period of time ago. At a step 34, $C'$ is updated and set equal to $C$. Then, at a step 36, $C$ is cleared and set equal to 0 (zero). The difference $\Delta C$ (delta C) is negative when the vehicle is subject to deceleration and thus variable with the deceleration which the vehicle is subject to and thus used as the deceleration indicative signal. Of course, the deceleration indicative signal may directly be given by the vehicle mount deceleration sensor (or an accelerenometer).

Figure 3:
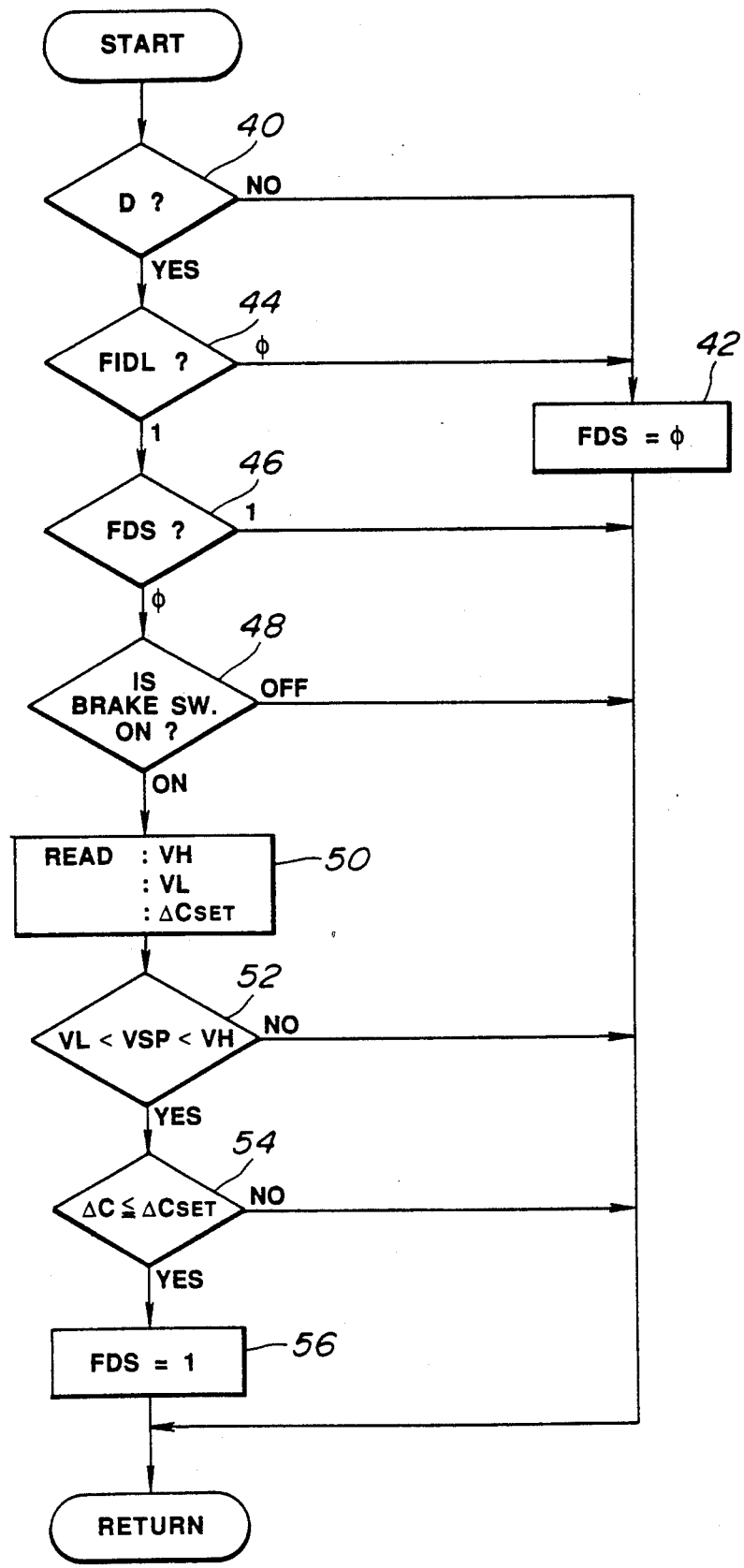
FIG. 3 is a flow chart of a program for controlling a downshift flag.

Referring to FIG. 3, the block 20 for effecting downshifting for engine brake running is further described. A flag FDS is provided which is set equal to 1 when the predetermined conditions for effecting downshifting for engine brake running are met. This flag FDS is called an engine brake downshift demand flag. The flag FDS is set equal to 0 (zero) when the selector of a manual valve is placed at D range position or an idle flag FIDL (which is later described) is equal to 0 (zero) or the brake switch is rendered OFF. The flag FDS is set equal to 1 when the selector is placed at the D range position and the idle flag FIDL is equal to 1 and the brake switch is rendered ON and the vehicle speed VSP falls in a range greater than a lower limit vehicle speed VL but less than an upper limit vehicle speed VH and the deceleration $\Delta C$ (delta C) is less than or equal to a predetermined degree, i.e., $\Delta C \leq \Delta C_{SET}$, where $\Delta C_{SET}$ is a predetermined negative value.

Describing along the flow chart shown in FIG. 3, at a step 40, it is determined whether the D range position is selected or not. When the D range position is not selected at the step 40, the program proceeds to a step 42 where the flag FDS is set equal to 0 (zero) before the program comes to an end. When at the step 40 it is determined that D range position is selected, the program proceeds to a step 44 where it is determined whether an idle flag FIDL is set equal to 1 or not. When it is determined that the flag FIDL is set equal to 0, the program proceeds to the above-mentioned step 42 before the program comes to an end. When it is determined that the flag FIDL is set equal to 1, the program proceeds to a step 46 where it is determined whether the flag FDS is set equal to 1 or 0. When it is determined that the flag FDS is set equal to 1, the program comes to an end. When it is determined at the step 46 that the flag FDS is set equal to 0, the program proceeds to a step 48 where it is determined whether the brake switch is rendered ON or OFF. When it is determined that the brake switch is rendered OFF, the program comes to an end. When it is determined at the step 48 that the brake switch is rendered ON, the program proceeds to a step 50. At the step 50, predetermined data corresponding to a gear position which the automatic transmission is shifted to are obtained by reading operation. The predetermined data are, the upper limit vehicle speed VH, the lower limit vehicle speed VL, and the predetermined deceleration $\Delta C_{SET}$. Then, the program proceeds to a step 52 where it is determined whether the vehicle speed VSP falls in a range which is greater than the lower limit vehicle speed VL but less than the upper limit vehicle speed VH or not. When it is determined that the vehicle speed VSP does not fall in the predetermined range, the program comes to an end. When it is determined at the step 52 that the vehicle speed VSP falls in the predetermined range, the program proceeds to a step 54 where it is determined whether the absolute value of the deceleration $\Delta C$ (delta C) is greater than or equal to the absolute value of the predetermined deceleration $\Delta C_{SET}$ or not. When it is determined that the absolute value of the deceleration $\Delta C$ is less than the absolute value of the predetermined deceleration $\Delta C_{SET}$, the program comes to an end. When it is determined at the step 54 that the absolute value of the deceleration $\Delta C$ is greater than or equal to the absolute value of the predetermined deceleration $\Delta C_{SET}$, the program proceeds to a step 56 where the flag FDS is set equal to 1.

Figure 4:
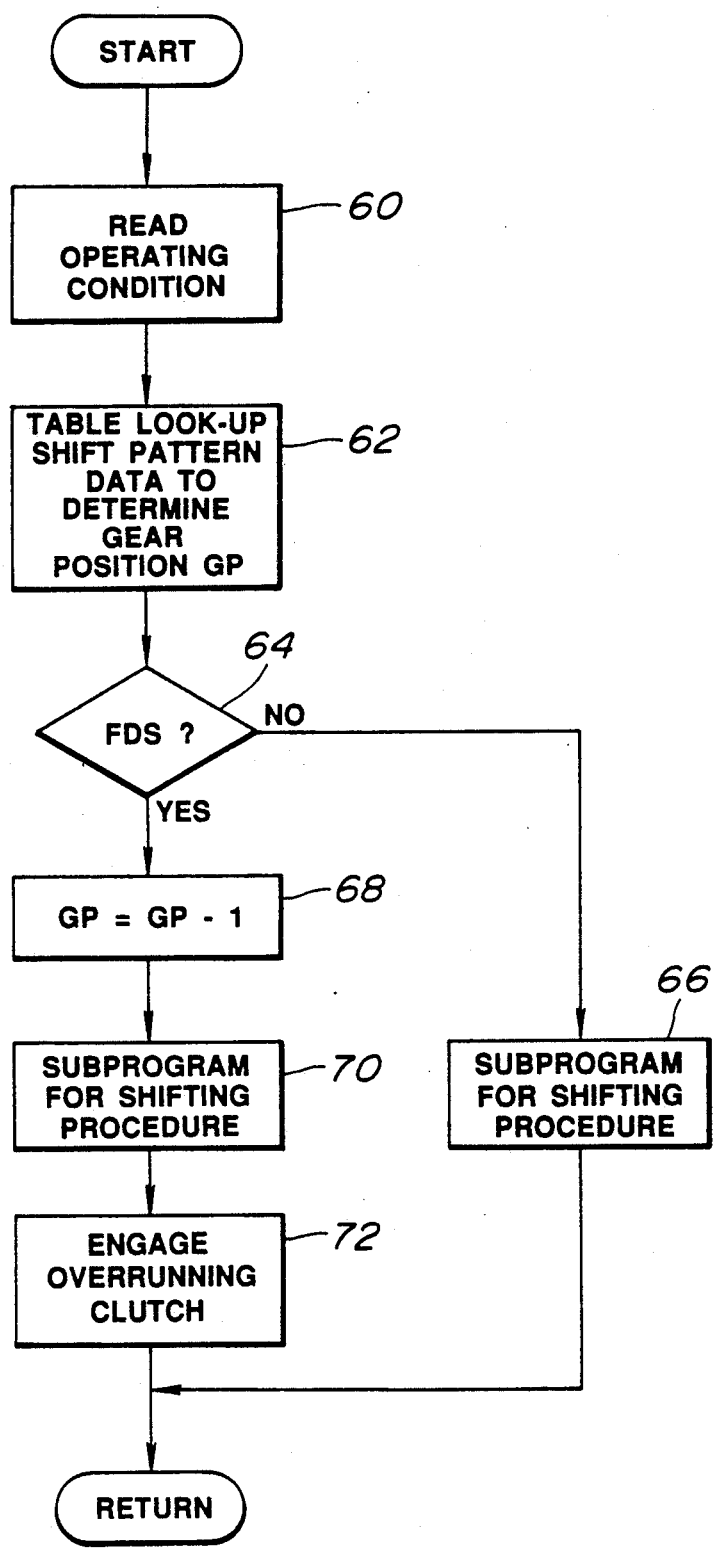
FIG. 4 is a flow chart of a program for effecting downshift and engine brake running.

Referring to FIG. 4, the shift controlling block 22 is further described. At a step 60, the operating conditions of the vehicle are obtained by a reading operation. Then, the program proceeds to a step 62 where a table look-up operation of shift pattern data is performed based on the operating conditions stored at the preceding step 60 to determine a gear position GP which the automatic transmission should take. The program proceeds to a step 64 where it is determined whether the flag FDS is equal to 1 or not. When it is determined that the flag FDS is equal to 0, the program proceeds to a step 66 where a subprogram for shifting procedure is executed. When it is determined that the flag FDS is equal to 1, the program proceeds to a step 68 where the gear position GP is decreased by 1. Then, the program proceeds to a step 70 where the subprogram for shifting procedure is executed. Then, the program proceeds to a step 72 where the engine brake running clutch (i.e., the overrunning clutch) is engaged.

Figure 5:
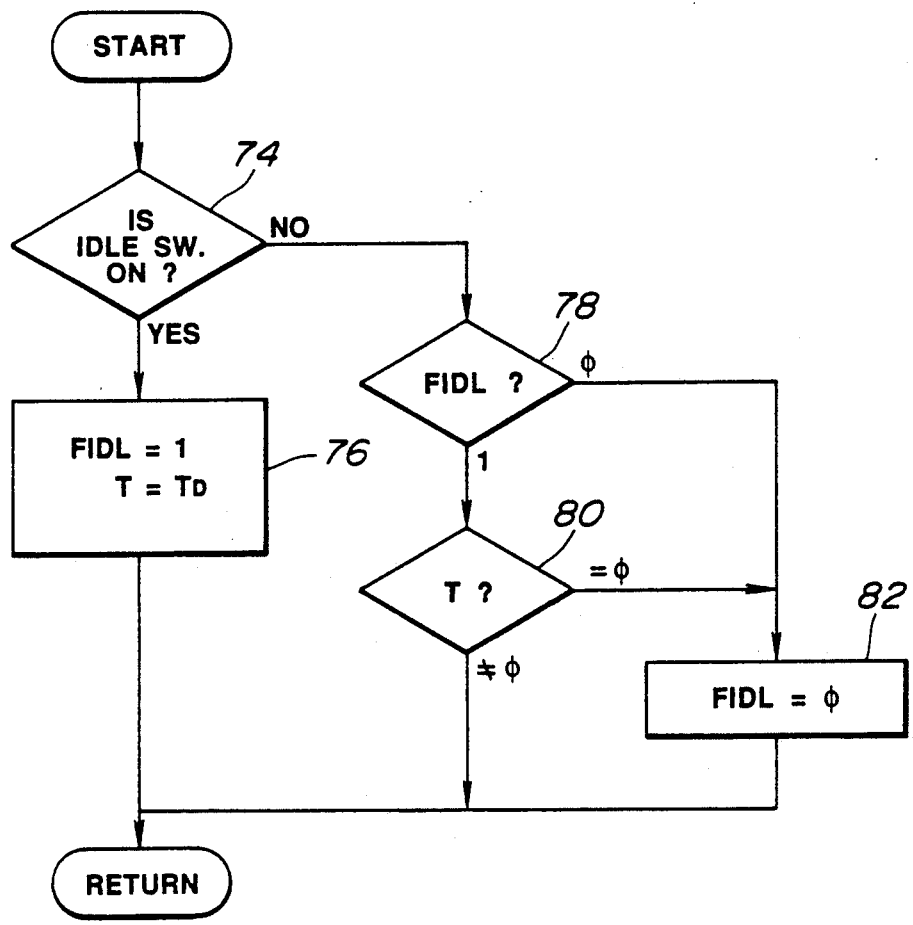
FIG. 5 is a flow chart of a program for controlling a idle flag such that the idle flag is kept being set equal to 1 for a predetermined delay time after an idle switch has been rendered OFF.
Figure 6:
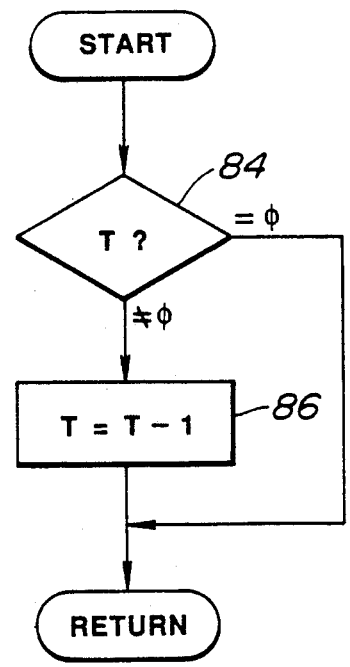
FIG. 6 is a flow chart of a program for decrement of a timer.

Referring to FIG. 5, the delay setting block 26 is further described. At a step 74, it is determiend whether the idle switch is rendered ON or not. When it is determined that the idle switch is rendered ON and thus the engine throttle is at the idle speed position, the program proceeds to a step 76 where the idle flag FIDL is set equal to 1 and a timer is set equal to a predetermined delay time $T_D$. When it is determined at the step 74 that the idle switch is rendered OFF and thus the engine throttle is not at the idle speed position, the program proceeds to a step 78 where it is determined whether the idle flag FIDL is equal to 1 or not. When it is determined that the idle flag FIDL is equal to 1, the program proceeds to a step 80 where it is determined whether the content of the timer T is equal to 0 (zero) or not. When it is determined that the content of the timer T is not yet reduced down to 0, the program comes to an end without clearing the idle flag FIDL. When it is determined at the step 80 that the content of the timer T is equal to 0, the program proceeds to a step 82 where the idle flag FIDL is cleared and set equal to 0. The decrement of the reduction timer T is performed along with a program as illustrated by the flow chart shown in FIG. 6 which is exected upon expiration of a predetermined period of time. In FIG. 6, at a step 84 it is determined whether the content of the timer T is equal to 0 (zero) or not. When it is determined that the content of the timer is not equal to 0, the program proceeds to a step 86 where the content of timer T is decreased by 1 (one).

From the preceding description of the first embodiment, it will now be appreciated that the idle flag FIDL is kept equal to 1 until the predetermined delay time $T_D$ is expired after the idle switch has been turned to OFF position. Thus, the flag FDS is kept equal to 1 until expiration of the predetermined delay time even after the accelerator pedal has been depressued during the engine brake running with the downshifted state and the program comes to an end after proceeding along the steps 40, 44, and 46 upon execution of each cycle until expiration of this delay time. As a result, the automatic transmission is prevented from upshifting immediately after the accelerator pedal has been depressed during the engine brake running with the downshifted state, alleviating shock or unplesant ride feel given to the driver.

A second embodiment according to the present invention is described. This embodiment is substantially the same as the first embodiment except the manner of setting an engine brake downshift demand flag FDS at a block 20.

According to this second embodiment, the flag FDS is set equal to 0 when (the selector of a manual valve is not placed at D range position) or (FIDL=0) or (the brake switch is rendered OFF) or (FIDL=1 and FIDL1=0). The flag FDS is set equal to 1 when (the selector is placed at the D range position) and (FIDL=1) and (the brake switch is rendered ON) and (the vehicle speed VSP falls in a range greater than a lower limit vehicle speed VL but less than an upper limit vehicle speed VH) and (the deceleration $\Delta C$ is less than or equal to a predetermined deceleration $\Delta C_{SET}$).

Figure 7:
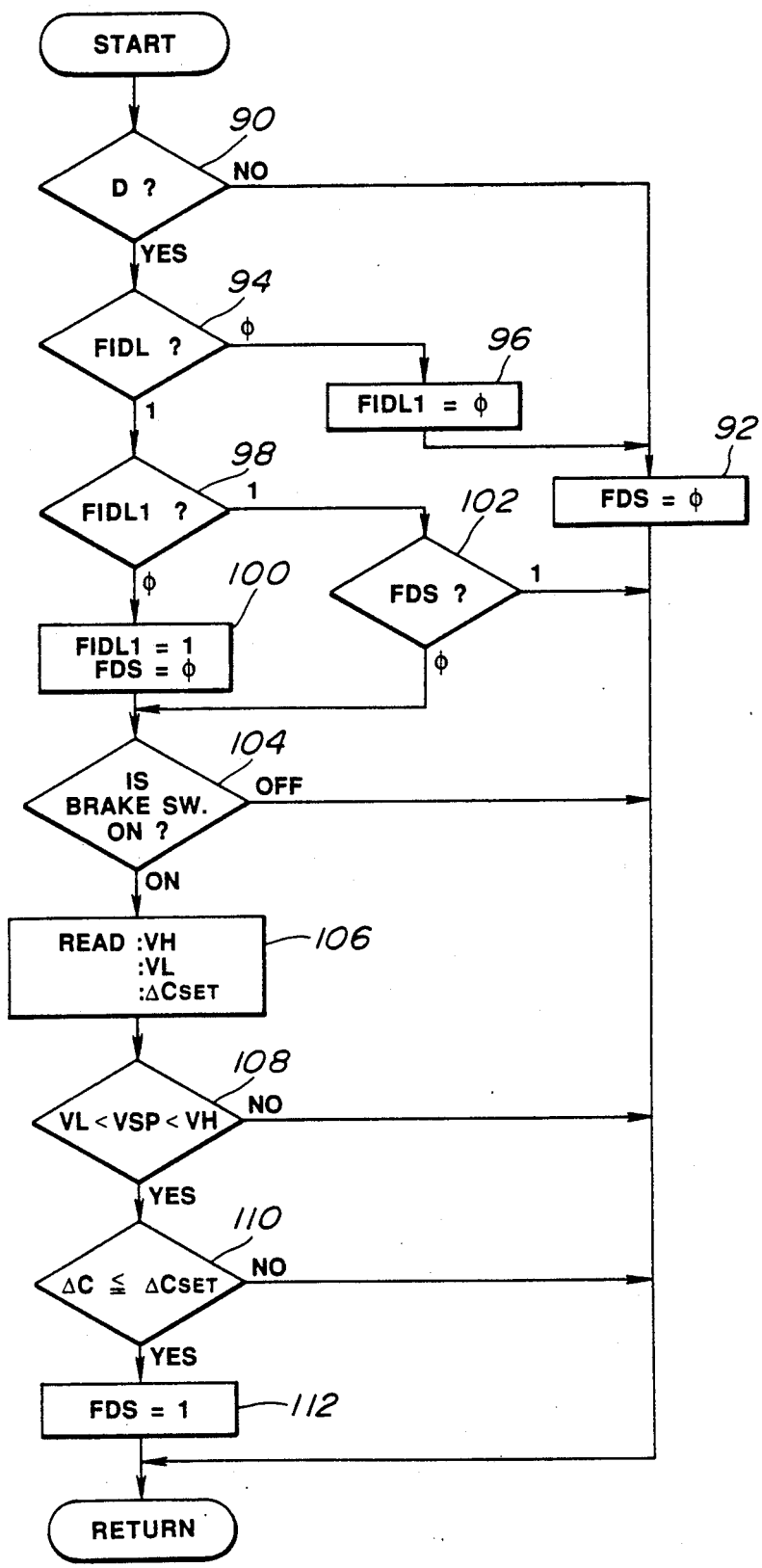
FIG. 7 is a similar view to FIG. 3, illustrating a flow chart of a program used in a second embodiment according to the present invention.

Describing further along the flow chart shown in FIG. 7, at a step 90, it is determined whether the D range position is selected or not. When the D range position is not selected at the step 40, the program proceeds to a step 92 where the flag FDS is set equal to 0 (zero) before the program comes to an end. When at the step 90 it is determined that D range position is selected the program proceeds to a step 94 where it is determined whether the flag FIDL is set equal to 1 or not. When at the step 94 it is determined that the flag FIDL is set equal to 0, the program proceeds to a step 96 where a flag FIDL1 is set equal to 0 and then to the above-mentioned step 92 where the flag FDS is set equal to 0. When at the step 94 it is determined that the flag FDL is set equal to 1, the program proceeds to a step 98 where it is determined whether the flag FIDL1 is set equal to 1 or not. When at the step 98 it is determined that the flag FIDL1 is set equal to 1, the program proceeds to a step 102 where it is determined whether the flag FDS is set equal to 1 or 0. When at the step 102 it is determined that the flag FDS is set equal to 1, the program comes to an end. When at the step 102 it is determined that the flag FDS is set equal to 0, the program proceeds to a step 104. When at the step 98 it is determined that flag FIDL1 is set equal to 0, the program proceeds to a step 100 where the flag FIDL1 is set equal to 1 and the flag FDS is set equal to 0 and then to the step 104. From the preceding description of the flow chart, it will now be noted that the flag FIDL1 is set equal to 0 immediately after the flag FIDL has been set equal to 0 (see steps 94 and 96), while it is set equal to 1 immediately after the flag FIDL has been set equal to 1 (see steps 94, 98 and 100). Thus, the flag FIDL1 is indicative of the state of the flag FIDL in the previous cycle or run of the program. Thus, it will be appreciated that the flag FDS is set equal to 0 when the idle switch is rendered ON again after the idle switch has been rendered OFF. At the step 104, it is determined whether the brake switch is ON or OFF. When it is determined that the brake switch is rendered OFF, the program comes to an end. When it is determined at the step 104 that the brake switch is rendered ON, the program proceeds to a step 106. At the step 106, predetermined data corresponding to a gear position which the automatic transmission is shifted to are obtained by reading operation. The predetermined data are, the upper limit vehicle speed VH, the lower limit vehicle speed VL, and the predetermined deceleration $\Delta C_{SET}$. Then, the program proceeds to a step 108 where it is determined whether the vehicle speed VSP falls in a range which is greater than the lower limit vehicle speed VL but less than the upper limit vehicle speed VH or not. When it is determined that the vehicle speed VSP does not fall in the predetermined range, the program comes to an end. When it is determined at the step 108 that the vehicle speed VSP falls in the predetermined range, the program proceeds to a step 110 where it is determined whether the deceleration $\Delta C$ (delta C) is less than or equal to the predetermined deceleration $\Delta C_{SET}$ or not. When it is determined that the absolute value of the deceleration $\Delta C$ is less than the absolute value of the predetermined deceleration $\Delta C_{SET}$, the program comes to an end. When it is determined at the step 110 that the absolute value of the deceleration $\Delta C$ is greater than or equal to the absolute value of the predetermined deceleration $\Delta C_{SET}$, the program proceeds to a step 112 where the flag FDS is set equal to 1.

From the above description of the second embodiment, it will be noted that during the period when the release of the engine brake running with the downshifted state is delayed, this brake running with downshifted state is released and an upshift takes place immediately when the accelerator pedal is released again after it has been depressed.

What is claimed is:

1. A method of controlling shifting in gear position in an automatic transmission for an automotive vehicle when the vehicle is subjected to deceleration, wherein the automatic transmission is downshifted and conditioned in engine brake running state after predetermined conditions have been met, the predetermined conditions including absence of a power demand by a driver of the automotive vehicle, the method comprising the steps of:
   determining whether or not there is a presence of the power demand after the predetermined conditions have been met; and
   releasing the automatic transmission from the engine brake running state upon expiration of a predetermined delay time beginning with determination of the presence of the power demand by said determining step.

2. A method as claimed in claim 1, wherein said power demand is detected when a throttle is opened.

3. A method as claimed in claim 2, wherein the opening of said throttle is detected when an idle switch is rendered OFF.

4. A method of controlling shifting in gear position in an automatic transmission for an automotive vehicle when the vehicle is subjected to deceleration, wherein the automatic transmission is downshifted and conditioned in engine brake running state after predetermined conditions have been met, the predetermined conditions including absence of a power demand by a driver of the automotive vehicle, the method comprising the steps of:
   determining whether or not there is a presence of said power demand after the predetermined conditions have been met;
   releasing the automatic transmission from the engine brake running state upon expiration of a predetermined delay time beginning with determination of the presence of the power demand by said determining step as long as the presence of said power demand is kept determined during said predetermined time delay; and
   releasing the automatic transmission from the engine brake running state upon determination of the absence of the power demand by said determining step before expiration of said predetermined time delay.

5. A method as claimed in claim 4, wherein said power demand is detected when a throttle is opened.

6. A method as claimed in claim 5, wherein the opening of said throttle is detected when an idle switch is rendered OFF.

7. A system for controlling shifting in gear position in an automatic transmission for an automotive vehicle when the vehicle is subjected to deceleration, wherein the automatic transmission is downshifted and conditioned in engine brake running state after predetermined conditions have been met, the predetermined conditions including absence of a power demand by a driver of the automotive vehicle, the system comprising:
   means for detecting the power demand; and
   control means for determining whether or not the power demand is detected after the predetermined conditions have been met and then releasing the automatic transmission from the engine brake running state upon expiration of a predetermined delay time beginning with the detection of the power demand after the predetermined conditions have been met.

8. A system for controlling shifting in gear position in an automatic transmission for an automotive vehicle when the vehicle is subjected to deceleration, wherein the automatic transmission is downshifted and conditioned in engine brake running state after predetermined conditions have been met, the system comprising:
   means for detecting the power demand; and
   control means for determining whether or not the power demand is detected after the predetermined conditions have been met and then releasing the automatic transmission form the engine brake running state upon expiration of a predetermined delay time beginning with the detection of the power demand as long as the presence of the power demand is kept determined during said predetermined time delay, said the control means being operative to release the automatic transmission from the engine brake running state upon determination of the absence of the power demand before expiration of said predetermined time delay.

9. A method of controlling shifting in gear position in an automatic transmission for an automotive vehicle, the method comprising the steps of:

determining one gear position;
determining whether predetermined conditions are met or not, said predetermined conditions including absence of a power demand by a driver of the automotive vehicle;
conditioning the automatic transmission at another gear position lower than said one gear position and in engine brake running state after it has been determined that said predetermined conditions are met;
detecting the presence of said power demand; and
conditioning the automatic transmission at said one gear position and releasing the automatic transmission from said engine brake running state upon expiration of a predetermined delay time beginning with detection of presence of said power demand after it has been determined that said predetemined conditions are met.

10. A method of controlling shifting in gear position in an automatic transmission for an automotive vehicle, the method comprising the steps of:
determining one gear position;
determining whether predetermined conditions are met or not, said predetermined conditions including the absence of a power demand by a driver of the automotive vehicle;
detecting the presence of said power demand;
conditioning the automatic transmission at another gear position lower than said one gear position and in engine brake running state when it is determined that said predetermined conditions are met;
conditioning the automatic transmission at said one gear position and releasing the automatic transmission from said engine brake running state upon expiration of a predetermined delay time beginning with detection of the presence of said power demand as long as the presence of said power demand remains detected during said predetermined delay time; and
conditioning the automatic transmission at said one gear position and releasing the automatic transmission from said engine brake running state upon absence of said power demand before expiration of said predetermined delay time.

* * * * *